June 23, 1959 H. J. HASBROUCK, JR 2,891,737

CLAMP FOR SECURING END OF TAPE OR FILM TO A REEL

Filed March 1, 1956

INVENTOR.

Harold J. Hasbrouck, Jr

BY

A. Napier Baker

ATTORNEY

United States Patent Office 2,891,737

Patented June 23, 1959

2,891,737

CLAMP FOR SECURING END OF TAPE OR FILM TO A REEL

Harold J. Hasbrouck, Jr., Teaneck, N.J.

Application March 1, 1956, Serial No. 568,898

4 Claims. (Cl. 242—74.2)

This invention relates to a clamp which is used with a reel for securing the end of a ribbon of magnetic tape or film thereto.

Although the problem of securing the end of tape or film to a reel has existed for some time, and although many efforts have been directed to solving the problem, as far as I am aware none of such improvements have been successful and the general practice is to preliminarily wind the end of the tape a few turns around the hub or core of the reel whereupon the reel may be rotated by suitable tape recorder mechanism to continue winding of the ribbon of tape or film. However, as is well recognized, this practice is awkward and the tape often slips out before it is sufficiently wrapped around the hub.

In accordance with this invention, I provide a simple form of tape end clamp which may be affixed either temporarily or permanently to the hub portion of a reel and which permits the end of a length of tape or film to be simply deposited in the clamp which will hold it securely against displacement or withdrawal and with a substantially predetermined degree of security. The clamp is inexpensive, easy to assemble, and most easily attached to the reel. Thereafter, while the reel is on the recorder panel, the clamp may be operated with one hand while the tape end is introduced therein by the other hand. Normal action of the clamp is to grasp the tape end so that when the user releases the clamp, the tape end will be firmly held in place.

My improved tape clamp, in a preferred form thereof, consists of a cylindrical, open ended resilient metal body serving as a spring member and having a pair of integral, divergent lips which define a side opening for the tape end. I provide means, either at one end, but preferably at both ends of the body member which, when depressed, serves to spread the body member radially outwardly so as to separate the lips from a normally closed position. This permits the tape end to be introduced through the lips. In a preferred form, the spreading members themselves are formed with a slot which communicates with the opening so that the tape end may not only be introduced through the opening but also through the slots so as to affect a good grip on the tape end. In this form, the clamp consists of only three parts, two of which, i.e., the spreading members, are identical. They are very easily assembled since they need be only pushed into the respective ends of the body member. Guide means are provided which insure that the spreading members are disposed in correct position so that their slots are in lateral communication with the tape opening which is defined by the lateral lips of the body member.

The tape end clamp, once installed in the reel, need not be removed therefrom at any time even if the reel is stored away with or without tape. Thus, if desired, it may be initially sold together with the reel as a portion thereof and it will thereafter facilitate the threading of tape on the reel by the user.

The invention will be further understood from the following description and drawings in which.

Figure 1:
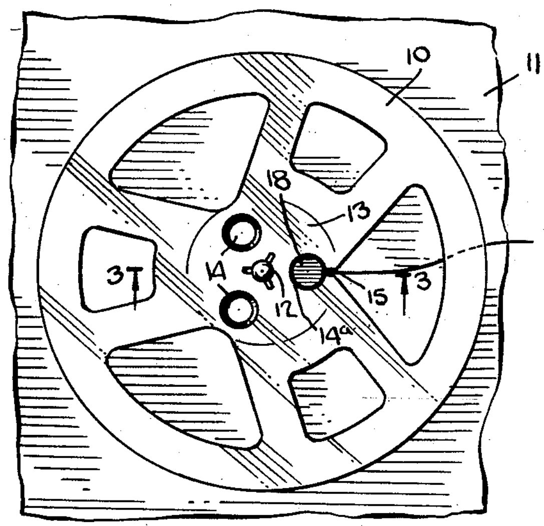
Figure 1 is a top plan view of a reel disposed on a recorder panel and provided with the tape end clamp of this invention.

The clamp is applied to a conventional reel 10 which is shown in Figure 1 as being disposed on an instrument panel 11. A spindle 12 extending through the panel or on a rotatable flange on the panel is received in a central opening of the hub 13 so as to drive the reel. The hub 13 is conventionally provided with a plurality of angularly spaced hub openings 14 which are often used for receiving driving studs disposed on panel 11 instead of employing a central spindle such as spindle 12 as illustrated in this application.

I employ one of the angularly spaced hub openings 14 to receive the tape end clamp of this invention. Ordinarily, the hub openings 14 are circumferentially uninterrupted but, for the purpose of accommodating the tape end as will hereinafter be shown, I form one of the hub openings, i.e., opening **14*a*, with a slot 15 which extends radially outwardly from opening 14*a*** with which it communicates.

The tape end clamp is formed essentially from three members, i.e., a spring member and a pair of spreading members. The spring member may be formed of flat ribbon material such as clock spring or Phosphor bronze and comprises the body member 16 which is an open-ended, cylindrical resilient metal body having a pair of integral diverging lips 17 which extend radially outwardly of the body 16. The spreading members comprising a pair of conical end members disposed in the body 16 and operative to spread the body radially or circumferentially.

The spreading members comprise a conical head 18 and a stem 19. Stem 19 is formed with a longitudinal or vertical slot 20 which serves to receive the tape end as will hereinafter be more fully described. Slot 20 extends diametrically across the bottom face of stem 19.

Figures 3, 4:
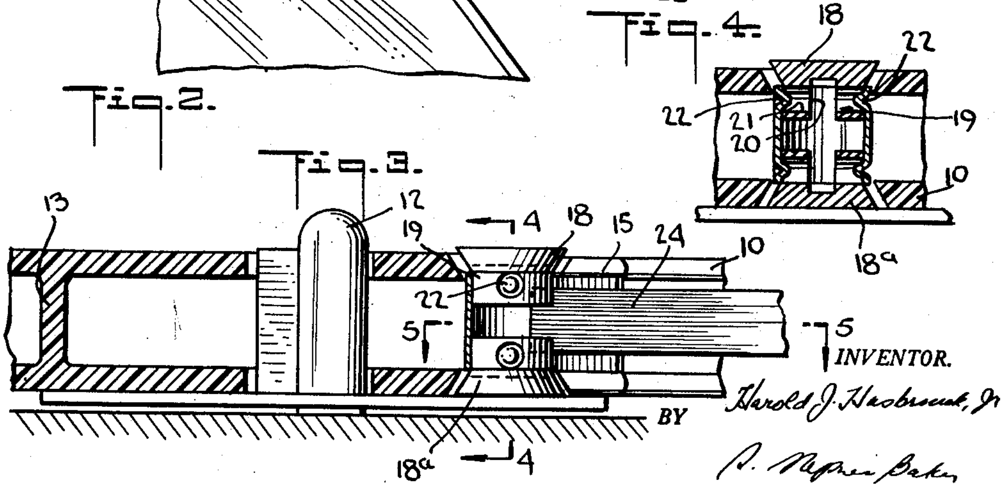
Figure 3 is an enlarged cross-sectional view as taken along the line 3—3 of Figure 1.
Figure 4 is a cross-sectional view as taken along the line 4—4 of Figure 3.

Stem 19 is also formed with a transverse bore 21 extending perpendicularly relative to the slot 20, as illustrated in Figure 4. The function of bore 21 is to receive and substantially center a pair of projections or detents 22 formed on the inner wall of the cylindrical body member 16. Thus, when the end member 18 is pushed into one of the open ends of the cylindrical body member 16, it should be so oriented that the projections or detents 22 will snap into the bore 21 and thus correctly dispose the spreading member in the body member. For reasons which will be described hereinafter, the bore 21 is preferably made of a diameter exceeding that of projection or detent 22 so as to enable the end member 18 to slide axially within body member 16 while still being maintained in properly oriented position by the detents 22.

Figure 6:
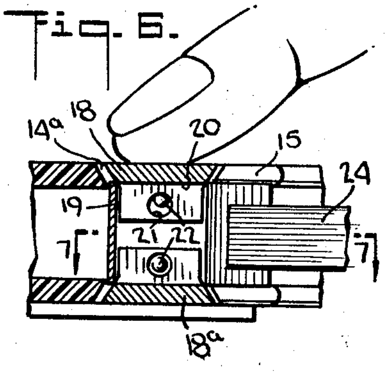
Figure 6 is a fragmentary view illustrating manual operation of the clamp.

The bottom conical end member **18*a* is of the same construction and function as the top conical end member. As illustrated in Figures 3, 4 and 6, the end members are deposited or applied to the body member 16 from the opposite open ends thereof and snapped into place by the respective bores in the opposing pairs of detents 22**, the outer end of the end members being of greater diameter than the body member and extending outwardly thereof so as to be manually accessible.

Figure 5:
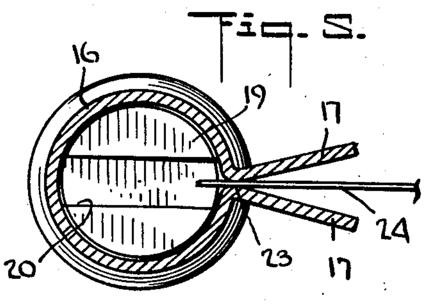
Figure 5 is an enlarged cross-sectional view as taken along the line 5—5 of Figure 3.
Figure 2:
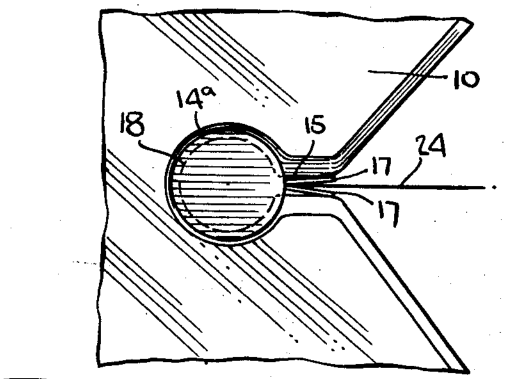
Figure 2 is an enlarged fragmentary view of the reel portion which is provided with the clamp.
Figure 7:
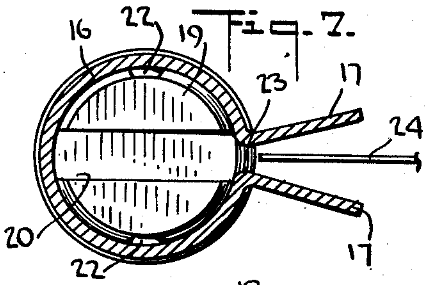
Figure 7 is an enlarged cross-sectional view as taken along the line 7—7 of Figure 6.

The invention is used as follows:

The body member 16 is first pushed into the hub opening 14*a* with the lips 17 extending into the slot 15 of the hub. It will be observed that the detents 22 are located 90 degrees away from the mouth 23 which is defined by the lips 17. Conical end member 18 is then inserted through one open end of the body 16 in such a position that the bore 21 will receive the detents 22, the member 18 thus snapping into place. The other conical end member 18*a* is then snapped into the opposite end of the body member and assumes the same angular position. At this time it will be observed that the longitudinal slots 20 are not only in alignment with and open toward each other but are in registry with slot 15. As illustrated in Figure 5, the mouth 23 is normally closed, the spring body member 16 being formed so as to produce such normal closure. The closing force is, of course, substantially predetermined by the spring nature of the body material and the bend therein which forms the lips. As a matter of fact, and purely as an example, I consider it desirable to employ a moderate force of about six ounces. This is adequate to hold the tape end under most encountered conditions but it will still pull out when necessary as, for example, at the completion of the rewind.

The reel having been deposited on the panel 11, it is a simple matter to introduce the end 24 of a length of magnetic tape or film by actuating spreading member 18 axially as illustrated in Figure 6, inserting the tape end 24 through slot 15, open mouth 23 and aligned slots 20 into the hollow of body member 16. Thereafter, the clamp is released by lifting the finger, the freely axially slidable end members being restored to their mouth or lip closing position by the action of the resilient body member 16 on the conical portions thereof, and the reel may then be actuated by the mechanism of the recorder to initiate winding or wrapping of the tape around the hub.

It can be seen therefore, that I have provided a simple and inexpensive tape end clamp which is most easily applied to a reel and which remains thereafter as a portion of the reel.

There has been shown what is now considered a preferred embodiment of the invention but it is obvious that changes and omissions may be made without departing from its spirit.

What is claimed is:

1. A tape end clamp comprising a hollow, cylindrical resilient, open ended body member having a longitudinal tape end receiving slit formed in the wall thereof from end to end, a pair of integral divergent lips extending radially outwardly of said body member from said slit and defining a tape end introducing opening, said lips being normally closed against each other so as to close said slit, and a pair of conical end members fitted into the respective ends of said body member and freely movable axially therein, said end members having the wider portions of their cones normally outwardly of said body member whereby movement of said end members inwardly toward said body member from the normally outward position of said end members spreads said body member radially and spreads said lips apart against the normal action thereof, and cylindrically round stems formed on the lower ends of said end members and disposed within said body member, and each of said end members being formed with a longitudinal slot, said longitudinal slots being aligned and opening toward each other, said longitudinal slots both being in register with said opening whereby a tape end may be introduced through said opening into both of said slots.

2. A tape end clamp according to claim 1 and including detent means formed on the inner wall of said body member, each of said conical end members having an opening formed therein for engaging said detent means whereby said longitudinal slots are maintained in registry with said opening.

3. A tape end clamp according to claim 2 and wherein said last-named opening formed in each of conical end members is round and is larger than the detent means which engage said last-named opening whereby said detent means are capable of movement within said last-named openings while being engaged thereby.

4. A tape end clamp comprising a hollow, cylindrical resilient body member, a pair of divergent lips integrally formed on and extending radially outwardly of said body member, said lips defining a normally closed tape end receiving opening, at least one conical end member slidably received in an end of said body member and adapted, when moved axially inwardly, to spread said body member radially so as to spread said lips for permitting the introduction of a tape end, said end member being normally maintained in an outward position relative to said body member wherein said lips are in their normally closed position, said conical end member being formed with a longitudinal slot communicating with said tape end receiving opening whereby a tape end may be deposited in said slot after said introduction through said lips, and detent means formed on the inner wall of said body member, said conical end member having an opening formed therein for engaging said detent means whereby said end member may be disposed on said body member in a predetermined position where said longitudinal slot is in alignment with the opening formed by said lips when they are spread.

References Cited in the file of this patent

UNITED STATES PATENTS

| | | |
|---|---|---|
| 385,026 | Waldron | June 26, 1888 |
| 850,892 | Ball | Apr. 23, 1907 |
| 951,718 | Arnsdorff | Mar. 8, 1910 |
| 1,118,689 | Sharlow | Nov. 24, 1914 |
| 2,775,413 | Liebman et al. | Dec. 25, 1956 |